United States Patent
Sinha et al.

(10) Patent No.: US 10,331,025 B2
(45) Date of Patent: Jun. 25, 2019

(54) ACOUSTIC IMAGING OF OBJECTS IN OPTICALLY OPAQUE FLUIDS

(71) Applicant: LOS ALAMOS NATIONAL SECURITY, LLC, Los Alamos, NM (US)

(72) Inventors: Dipen N. Sinha, Los Alamos, NM (US); Curtis F. Osterhoudt, Los Alamos, NM (US); Cristian Pantea, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 91 days.

(21) Appl. No.: 14/062,731

(22) Filed: Oct. 24, 2013

(65) Prior Publication Data

US 2014/0050046 A1    Feb. 20, 2014

Related U.S. Application Data

(63) Continuation of application No. 12/925,658, filed on Oct. 26, 2010, now abandoned.

(60) Provisional application No. 61/255,014, filed on Oct. 26, 2009.

(51) Int. Cl.
*G03B 42/06* (2006.01)
*G01S 15/89* (2006.01)

(52) U.S. Cl.
CPC ........... *G03B 42/06* (2013.01); *G01S 15/895* (2013.01); *G01S 15/8913* (2013.01); *G01S 15/8934* (2013.01)

(58) Field of Classification Search
CPC . G03B 42/06; G01S 15/8913; G01S 15/8934; G01S 15/895
USPC ................... 73/603; 367/25; 181/102, 105
See application file for complete search history.

(56) References Cited

U.S. PATENT DOCUMENTS

| | | | | |
|---|---|---|---|---|
| 3,614,891 A | * | 10/1971 | Nolte | E21B 47/0003 181/104 |
| 3,786,894 A | * | 1/1974 | Lebreton | G01V 1/52 181/104 |
| 3,872,421 A | * | 3/1975 | Rogers | G10K 15/02 310/322 |
| 3,974,476 A | * | 8/1976 | Cowles | B06B 1/0651 181/102 |
| 4,058,003 A | | 11/1977 | Macovski | |
| 4,241,611 A | | 12/1980 | Specht et al. | |
| 4,281,549 A | | 8/1981 | Kretz | |
| 4,849,872 A | | 7/1989 | Gassler | |
| 5,179,541 A | | 1/1993 | Weido | |

(Continued)

OTHER PUBLICATIONS

International Searching Authority, International Search Report, dated Dec. 30, 2010, pp. 1-9, PCT/US10/002850.

*Primary Examiner* — Xin Y Zhong (74) *Attorney, Agent, or Firm* — Samuel M. Freund; Cochran Freund & Young LLC (57) ABSTRACT

The present invention is a method and an apparatus that can image objects immersed in optically opaque fluids using ultrasound in a confined space and in a harsh environment. If the fluid is not highly attenuating at frequencies above 1 MHz, where commercial ultrasound scanners are available, such scanners can be adapted for imaging in these fluids. In the case of highly attenuating fluids, such as drilling mud, then a low frequency collimated sound source is used.

25 Claims, 9 Drawing Sheets

(56) References Cited

U.S. PATENT DOCUMENTS

| | | | | |
|---|---|---|---|---|
| 5,719,823 | A * | 2/1998 | Earp | ............... G01S 7/539 367/138 |
| 6,186,004 | B1 | 2/2001 | Kaduchak et al. | |
| 7,839,718 | B2 * | 11/2010 | Vu | ............... G01V 1/46 181/104 |
| 2006/0062082 | A1 * | 3/2006 | Mandal | ............... G01V 1/44 367/25 |

* cited by examiner

ACOUSTIC IMAGING OF OBJECTS IN OPTICALLY OPAQUE FLUIDS

PRIORITY STATEMENT

This application is a Continuation Application of Non-provisional patent application Ser. No. 12/925,658, which was filed on Oct. 26, 2010, which claims priority under 35 U.S.C. § 119 from U.S. Provisional Patent Application No. 61/255,014, filed on Oct. 26, 2009, the disclosures of which are incorporated herein by reference to the fullest extent consistent with the present disclosure.

STATEMENT REGARDING FEDERAL RIGHTS

This invention was made with government support under Contract No. DE-AC52-06NA25396, awarded by the U.S. Department of Energy. The government has certain rights in the invention.

BACKGROUND OF INVENTION

This invention relates to ultrasonic imaging. More particularly, the present invention relates to obtaining ultrasonic images of items that are immersed in optically opaque and often, in addition, acoustically attenuating fluid media.

There are situations where it is necessary to image objects that are in an environment, such as motor oil or crude oil, or mud or other optically opaque media. For example, there is a need to inspect fuel tanks of ships or large boats that may hide contrabands. Such inspection is typically carried out using a long stick to feel through the fuel compartment to locate objects. Another example is to address the need in the oil/gas industry to visualize the down-hole drilling environment where it is necessary to monitor drill pipe, casing, and drilling collars and also to identify and then retrieve dropped testing tools, logging tools, and tubing. Currently, there is not an efficient and reliable method of accomplishing this.

The current state-of-the-art is to lower a lead impression disc down the pipeline and to then try to get an imprint of the dropped object on the lead disc. The impression produced by this method is highly inadequate and does not provide much depth of field information. This method does not result in a detailed image of any kind. It is very difficult to tell what the dropped object is from the crude impression obtained by this method.

Another method recently introduced is to lower a regular optical camera down the pipeline but this requires replacing the existing drilling fluid with clear water that takes several days in a regular well-bore and lots of adjustments before a useful image can be captured. Infrared imaging has also been explored and it has the ability to image a short distance through water and some low API crude oil but no imaging is possible through heavy oil or drilling mud. The environment encountered in well-bores for oil/gas exploration is rather harsh (corrosive fluids, high pressure and temperature) and the space available is confined, typically the size of the bore hole. It is also important to be able to obtain some depth of field information to understand the nature of the object of just getting a surface image.

The present invention provides the much-needed ability to provide clear and identifiable images of objects in optically opaque and acoustically attenuating fluids, such as drilling mud, heavy crude oil, brine/oil mixture, and bubbly fluids.

SUMMARY OF INVENTION

An aspect of the present invention is a method and an apparatus that can image objects immersed in optically opaque fluids using ultrasound in a confined space and in a harsh environment. If the fluid is not highly attenuating at frequencies above 1 MHz, where commercial ultrasound scanners are available, such scanners can be adapted for imaging in these fluids. In the case of highly attenuating fluids, such as drilling mud, the requirements for the imaging system are a lot more stringent as this requires a low frequency collimated sound source.

In one aspect of the invention the apparatus for imaging an object in opaque fluids hereof may include: at least one transducer for generating a directed, ultrasonic sound beam having a chosen frequency and also for receiving reflected or scattered sound from the target object. The transducer is mechanically scanned to direct the sound beam in a two-dimensional pattern using a mechanical wobbler such that an image of the target object can be produced from the reflected signal through Conventional electronics.

In another aspect of this invention the apparatus for imaging an object in opaque fluids hereof may include: an array of transducers that can be electronically scanned in phased array manner to direct an ultrasonic beam and electronically scan the beam over of an area. The same array is used for receiving the reflected and scattered signal from the object. This signal is processed to create an image of the object.

In a further aspect of this invention the apparatus for imaging objects in opaque fluids in harsh environment hereof may include: at least one transducer for generating a directed, ultrasonic sound wave having a chosen frequency and also for receiving reflected or scattered sound from the target object. The transducer is protected inside a metal tube so the imaging is performed through a metal plate.

In yet another aspect of the present invention the method for imaging of an object within opaque fluids hereof may include the steps of: generating a directed and collimated ultrasonic sound wave having a chosen frequency, wherein a low frequency ultrasonic sound wave is created by a parametric array by combining two high frequency sound waves in an acoustic nonlinear fluid, such as Fluorinert 43, and this low frequency wave is directed toward the object to be imaged; detecting the reflected and scattered signal from the object via a symmetrically placed receiver transducer close to the source; and electronically analyzing the signal to produce an image of the object.

Benefits and advantages of the present invention include providing a quick way image objects. Although the examples below use the present invention in the oil industry, the ability to image objects in opaque fluids may be applied to many industries, particularly the medical arena.

BRIEF DESCRIPTION OF THE DRAWINGS

FIG. 2a is a picture of pacman shaped metal object and FIG. 2b. is a still image from a real-time video obtained from the ultrasound scanner of a pacman shaped object immersed in motor oil.

FIG. 3a is a picture of a metals spring and FIG. 3b. Still image made from a real time video obtained from the ultrasound scanner of the spring in motor oil.

DETAILED DESCRIPTION

Referring to the drawings in general, it will be understood that the illustrations are for the purpose of describing a particular embodiment of the invention and are not intended to limit the invention thereto.

The present invention includes an apparatus and method for acoustic imaging in optically opaque fluids with a varied amount of acoustic attenuation from moderately low (e.g., brine mixed with oil or light crude) to very high (e.g., drilling mud). Imaging in such media is very challenging because of the conflicting requirements that need to be satisfied. For example, higher attenuation means shorter penetration depth and the attenuation usually varies as square of the frequency. Therefore, it requires lower frequency to obtain deeper penetration into the fluid. However, lower frequency means higher beam spread that affects the spatial resolution in the image. Lower frequency also requires larger size transducers and this is difficult to accommodate if the measurement needs to be made in a bore hole or in any other confined space. Moreover, for a higher quality image in terms of higher signal-to-noise ratio a higher frequency bandwidth is required. Unfortunately, a lower frequency transducer has a lower bandwidth. Based on these competing requirements, an imaging system that is compact but provides a low frequency narrow beam is required. In moderately low attenuating fluid, sound can penetrate the fluid several tens of centimeters even at frequencies as high as 3 MHz. Commercially available ultrasound scanners operate in the frequency range above 1 MHz. However, the scanning head (the sensor part) is very fragile and cannot be used in harsh environments, such as where there is very high pressure. Developing an imaging system capable of withstanding such environment can be very expensive. In one aspect of the present invention the existing commercially available scanning head is encased in a sturdy metal pipe for protection but still performs its imaging functions even when the sound beam from the scanning head has to go through a metal plate.

Figure 1:
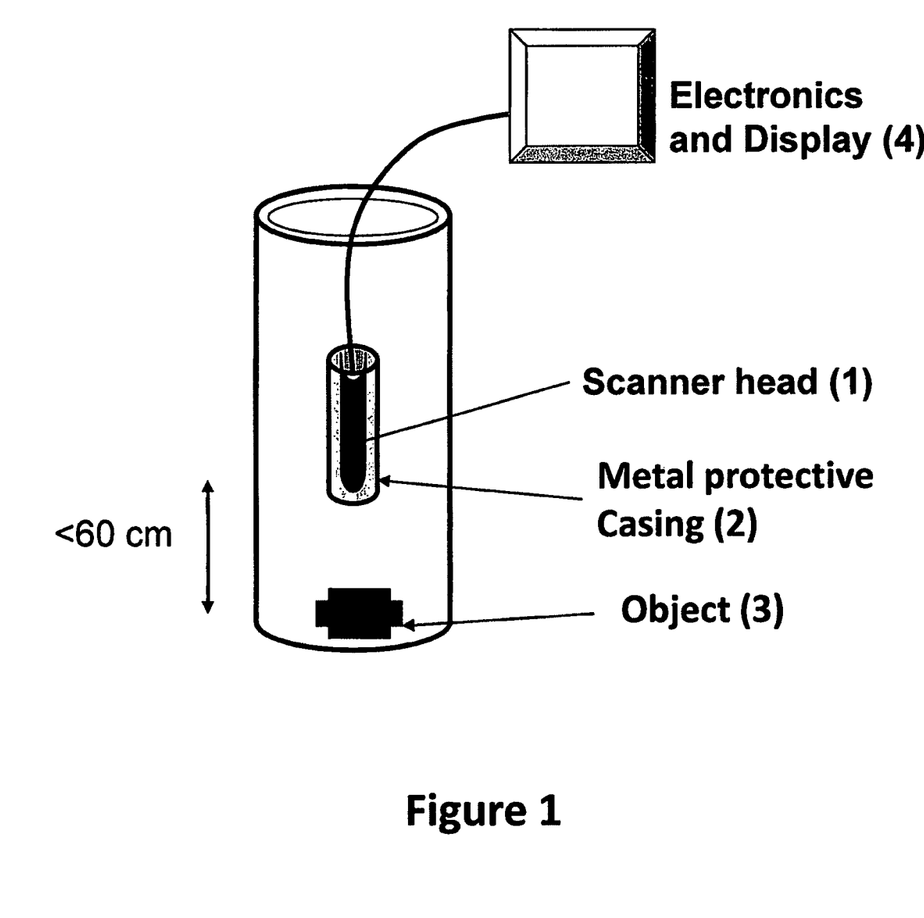
FIG. 1 shows a schematic of the instrument including the scanner head inside a protective metal tube.

FIG. 1 schematically shows one embodiment of the present invention. A scanner head is placed inside a metal protective casing 2. The image of the intended object 3 is shown on display 4. In one example, the scanning head of a commercial ultrasound scanner (the wobbler type) operating at 3.5 MHz was placed inside a steel pipe with a wall thickness of 2.5 mm and diameter 5 cm. However, any other type of ultrasound scanner may be used, including the phased array kind. In the example described above, the space between the front of the scanner head and the faceplate of the pipe through which the sound beam exits was filled with coupling gel. One of ordinary skill in the art would likely hypothesize that the arrangement of the present invention would severely degrade the imaging capability of the scanning system for a variety of reasons, such as multiple reflections within the plate thickness, refraction of the beam through the plate, and impedance mismatch between the metal plate and the liquid in which the object is immersed. However, the results of experiments with the present invention indicate that a useful image can be obtained and the metal pipe provides protection to the scanning head.

Figure 2:
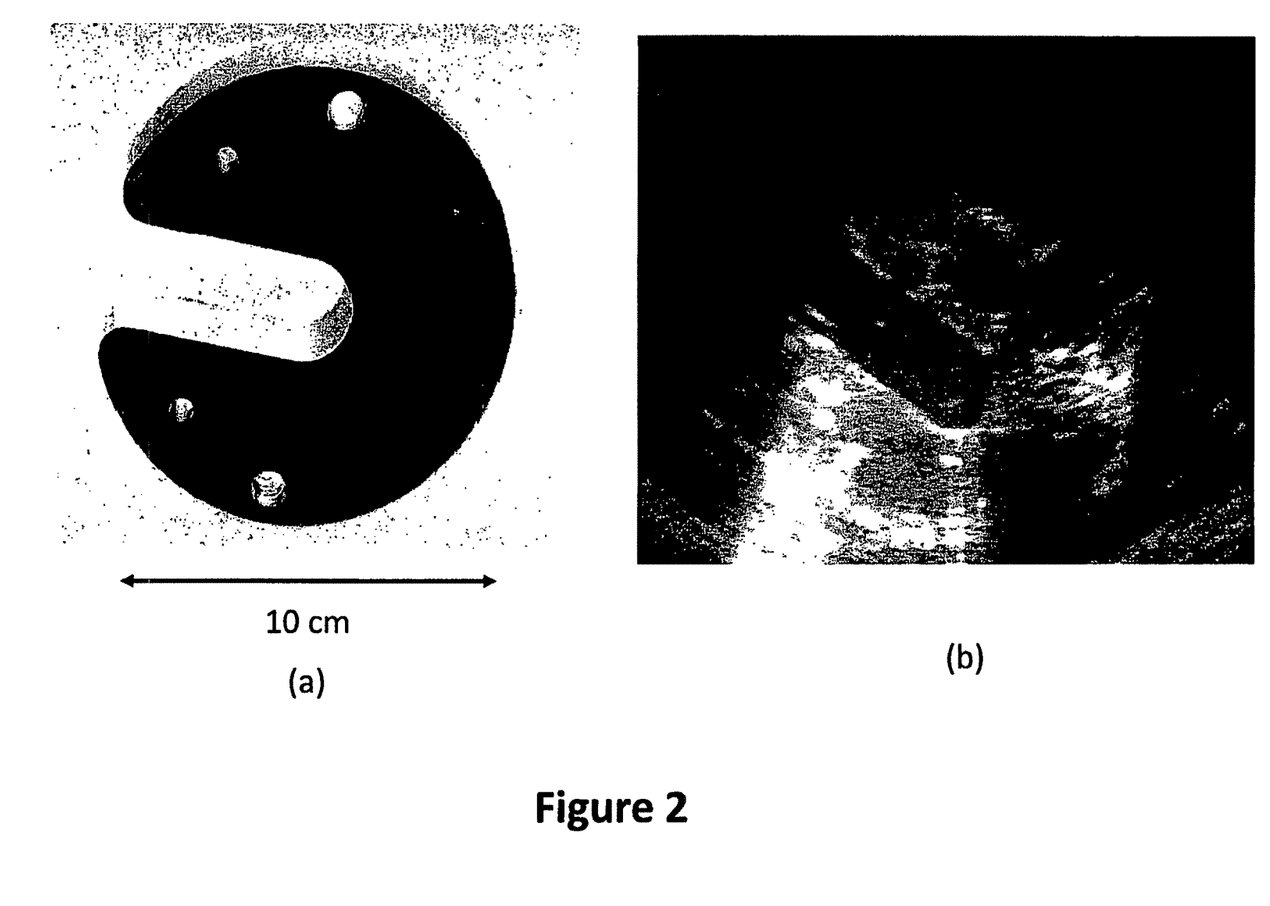

A photo of a metal object shaped as a Pacman that is 10 cm in diameter is shown in FIG. 2a. In one experiment, the Pacman was immersed in 10W-40 motor oil inside a 15 cm diameter pipe and was placed at the bottom of the pipe. One embodiment of the present invention was then used to image the object. FIG. 2b is a still image captured from a real-time video from the scanner output. As FIG. 2b shows, the object can indeed be imaged using the present invention.

Figure 3:
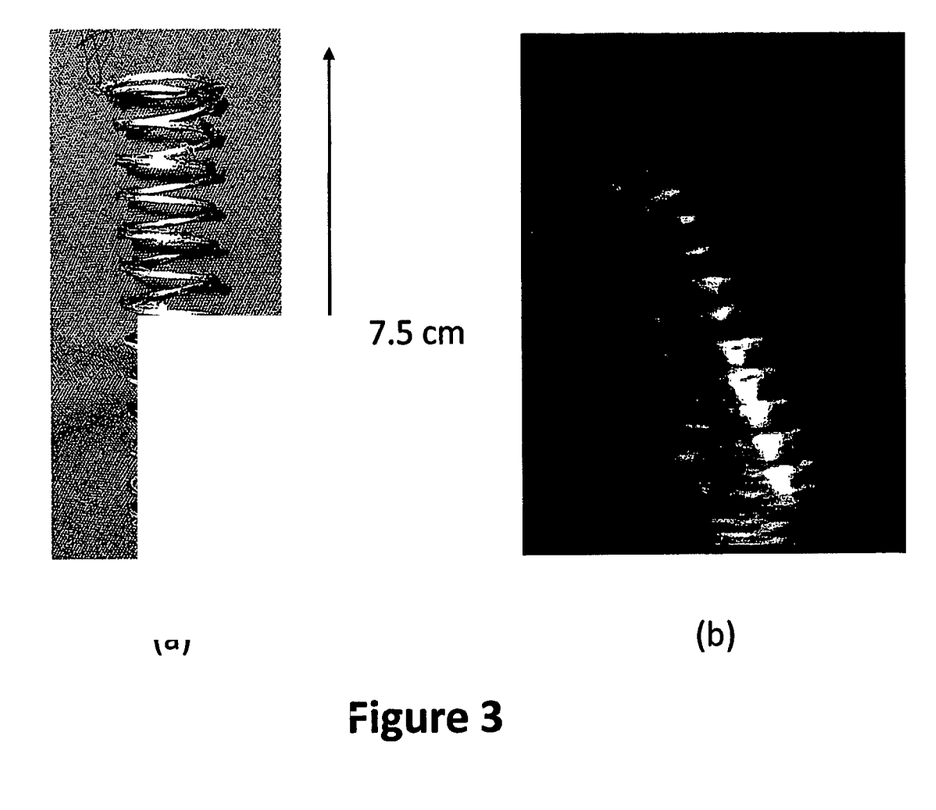

FIG. 3a shows a 7.5 cm long metal spring as the target object to be imaged. The purpose of using the spring is to demonstrate the high spatial resolution possible with the method of the present invention. The spring is immersed in motor oil similar to the Pacman shown in FIGS. 2a and 2b. FIG. 3b is a still image captured from a real-time video of the ultrasound scanner output and it shows that the spring can be quite clearly imaged even through the pipe wall 2 that the scanner head 1 is encased in. The quality and resolution of the image is excellent.

Several experiments were conducted in which measurements were made in water and also in drilling mud using the embodiment described in FIG. 1. Imaging in water was quite straightforward and the sound penetration in water was several feet. However, imaging in drilling mud was very difficult and the penetration depth was less than 2 cm. The object 3 needed to be in very close proximity with the scanner head 1. Although this approach works well for low attenuating fluid, it is not practical for imaging objects in drilling mud or other highly attenuating fluid. This is because the high frequency (3.5 MHz) of the scanner that does not penetrate beyond a few cm in the highly attenuating mud. It is not possible to simply substitute the high frequency transducer used in this scanner with a much lower frequency one as the beam spread will be very large, which will severely limit the spatial resolution. Typically, the frequency needs to be lower than 600 kHz to be practical in terms of providing high quality image with sufficient depth of field (e.g., >15 cm). Such low frequency transducers will be quite large (both diameter and thickness) and heavy and the simple mechanism of a typical wobbler would not work. It is also not possible to devise a phased array imaging system that is small enough at such a low frequency because of the size of the transducer elements needed for the array.

Figure 4:
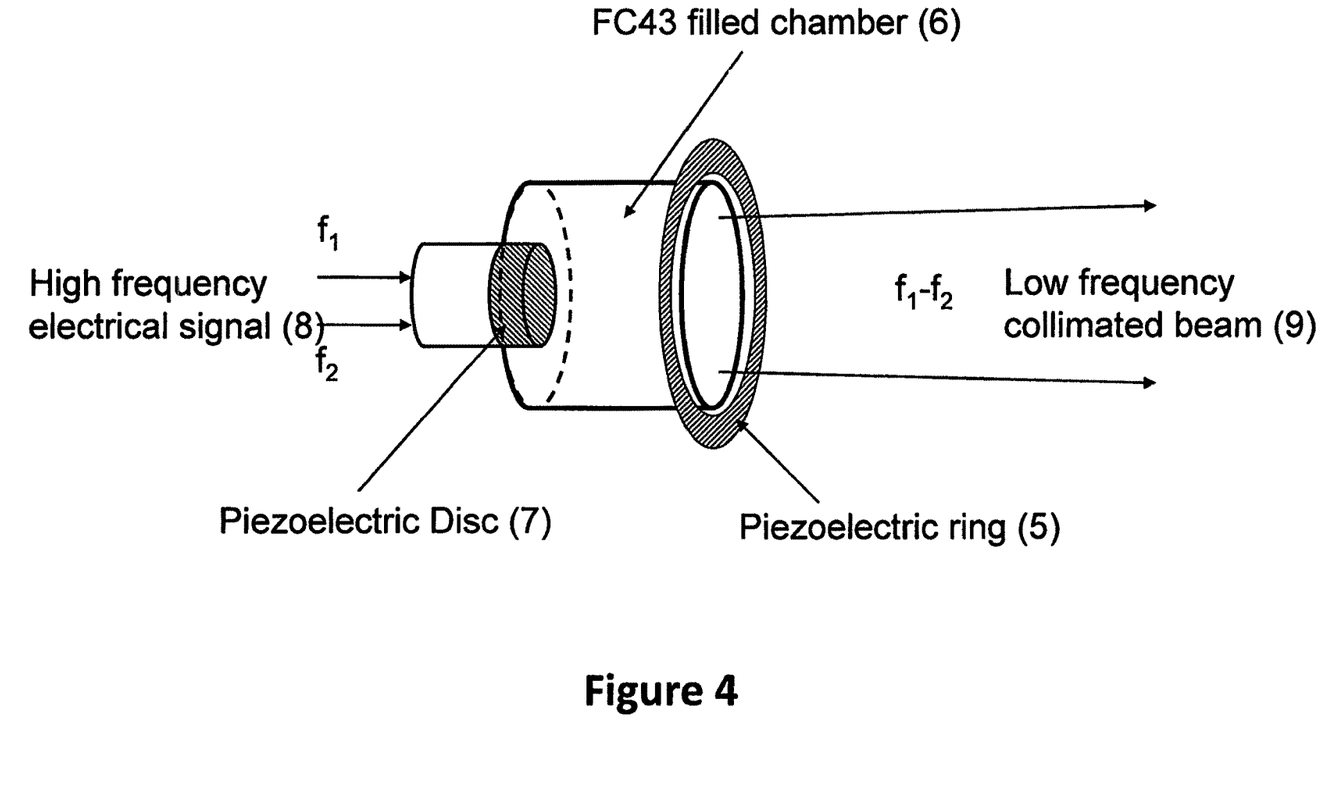
FIG. 4 is a schematic representation of the parametric source using FC43 as the nonlinear medium and the ring-shaped receiver.

This invention overcomes all these difficulties by using a parametric sound source that is highly compact but can provide a highly collimated beam at frequencies from as low as 50 kHz to 1 MHz. The design of one embodiment of the sound parametric source is shown schematically in FIG. 4. It consists of a piezoelectric disc 7. The disc 7 may be approximately 5 mm in diameter. The disc 7 is air-backed and is enclosed in a hollow cylinder 6, which may be filled with a liquid 43) that has high acoustic nonlinearity (beta ~7.5). The cylinder 6 may be made of any solid. Other liquids within the Fluorinert family can also be used. Fluorinert liquid (FC 43) has a very low sound speed (~650 m/s), which is a fraction that in water. If two high frequency ($f_1$ and $f_2$) sound waves 8 are allowed to propagate in this liquid in a collinear manner, these two frequencies mix in this nonlinear medium and generate both a difference frequency and a sum frequency. The sum frequency gets attenuated very quickly as the sound attenuation is proportional to square of the frequency. The two primary sound waves of high frequency (typically 1-10 MHz) are also rapidly attenuated in the liquid. This leaves a difference frequency sound beam to travel while maintaining the collimation of the primary waves. For example, if a sound wave of 9 MHz is mixed with another wave at 8.5 MHz, the difference frequency sound wave will have a 500 kHz frequency but it will also have the beam spread of the 8.5 MHz primary wave. This method is called parametric generation of low frequency collimated sound. The mixing length in the liquid for Fluorinert family of liquids is limited by what is frequently called the shock length that is related to the primary frequency and the beta of the liquid. The higher the frequency shorter is the shock length. The shock length represents a maximum length; beyond this length if too much power is applied to the transducer, the system will produce shock wave or higher harmonics. The shock length therefore limits the power generated in the difference frequency wave. Typically, the strength of the difference frequency signal is more than 1000 times less than the strength of the primary signal. With a collimated beam this difference can be much greater.

Another factor that limits the power of the difference frequency signal generated is the frequency step down factor. If the ratio of the difference frequency to the primary frequency is more than 20 then the signal strength of the difference frequency goes down rapidly as a function of the step down ratio. Therefore, it is important to select the proper operating factors. If the difference frequency required is very low, the primary frequencies need to be lower as well. For example, the shock length at 9 MHz in FC43 is approximately 1 cm and thus the mixing length must also be approximately 1 cm. As a result, a compact source is developed. For example, the length of the FC43-filled cylindrical tube used in one embodiment of this invention was 2 cm, and it is possible for it to be been half that length. However, the slightly longer length used was to accommodate lower frequencies. This geometry allowed the generation of a difference frequency collimated signal with frequency that could be varied from a low of 150 kHz to 3 MHz. This is an extremely high frequency bandwidth and cannot be obtained by any conventional means.

Figure 5:
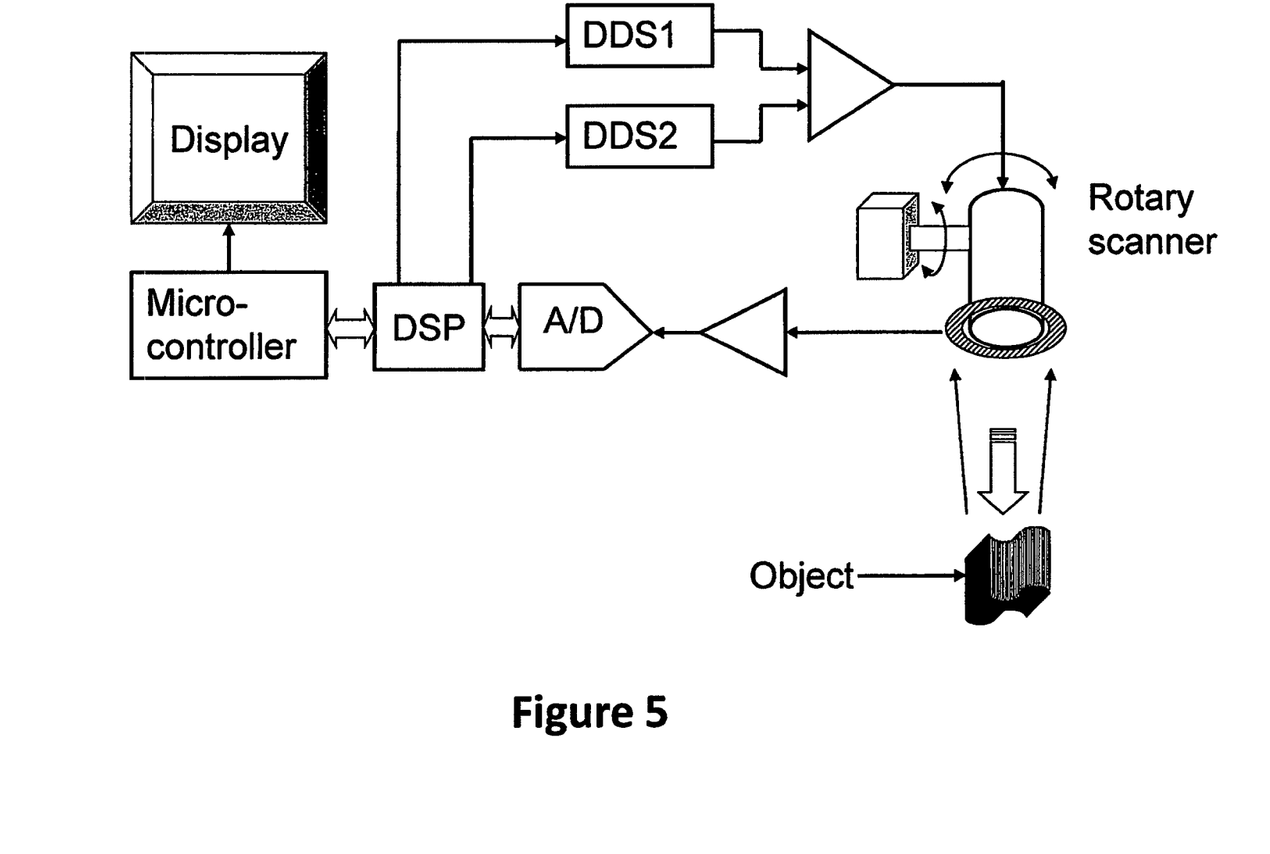
FIG. 5 is a schematic of the imaging system using the parametric source.

A complete imaging system is described schematically in FIG. 5. This is for illustration purposes only and may have many variations. This design shown in FIG. 5 follows closely the design of a traditional wobbler type of imaging system where the sound source is wobbled with mechanical drive to allow it to scan an arc shaped path. However, this design can be easily converted to a linear x-y scanning system as well. The mechanical scanning system allows the sensor head (the parametric source) to move in two orthogonal directions covering a 2-dimensional area. The sound that is scattered or reflected from a target is detected by a ring transducer that is placed around the mouth of the sound source. This makes the system collinear. In another embodiment, small transducers may be placed around the source and connected together in parallel to act as the receiver. The receiver is selected for its ability to respond in the low frequency so that it can detect the difference frequency signal. The two high frequency primary signals in the form of tone bursts are generated by two separate DDS (direct digital synthesizers) modules at the same time and then combined before being amplified by a power amplifier and then fed to the source transducer which in the pictured embodiment is an air-backed piezoelectric disc. The amplitude modulating a carrier signal can also be used instead of combining two separate signals. For better depth determination, the broadband characteristic of the source is utilized.

In one experiment, a fixed frequency tone-burst signal is combined with a frequency chirp signal. For example, a fixed frequency signal at 9 MHz and of 100 μs duration is combined with a chirp signal that may vary between 8.4 MHz and 8.8 MHz and of 100 μs duration. This generates a difference frequency chirp signal between 200-600 kHz. The chirp method provides significantly higher spatial resolution for depth determination. In experiments, it was determined that a single piezoelectric disc works better than the conventional broadband commercial transducers, however either may be used. The received signal is also amplified before being sent to a DSP (digital signal processor module). The DSP carries out all the data analysis and is controlled by a microcontroller. The processed data is displayed on a screen.

Figure 6:
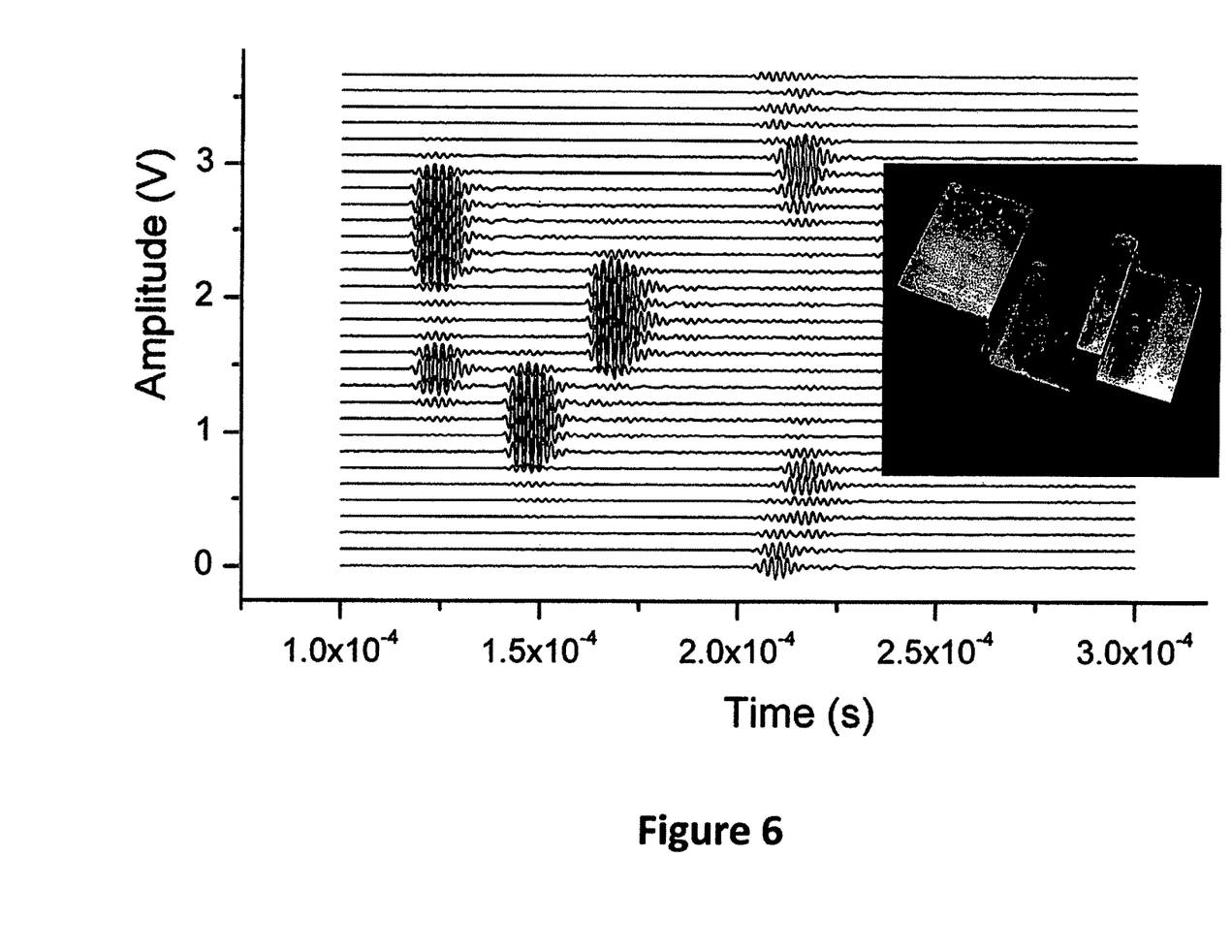
FIG. 6 shows the time-of-flight measurement used to produce the image of the object shown in the inset.

The data processing and image construction consists of determining the time-of-flight signal at each physical point of scan on a 2-D surface. This is shown in FIG. 6. The inset shows a photo of the object being imaged. The location of the return tone-burst from the various depths of the object provides the information for image reconstruction. The beginning of the tone burst is used to determine the depth information. However, for a more accurate image reconstruction, a cross-correlation is performed where the peak in the correlation identifies the time-of-flight information. A frequency chirp approach allows significantly better time-of-flight determination through the cross-correlation approach as the signal-to-noise improvement is proportional to the product of signal duration and the frequency bandwidth. The DSP allows such cross-correlation calculations in real-time.

Figure 7:
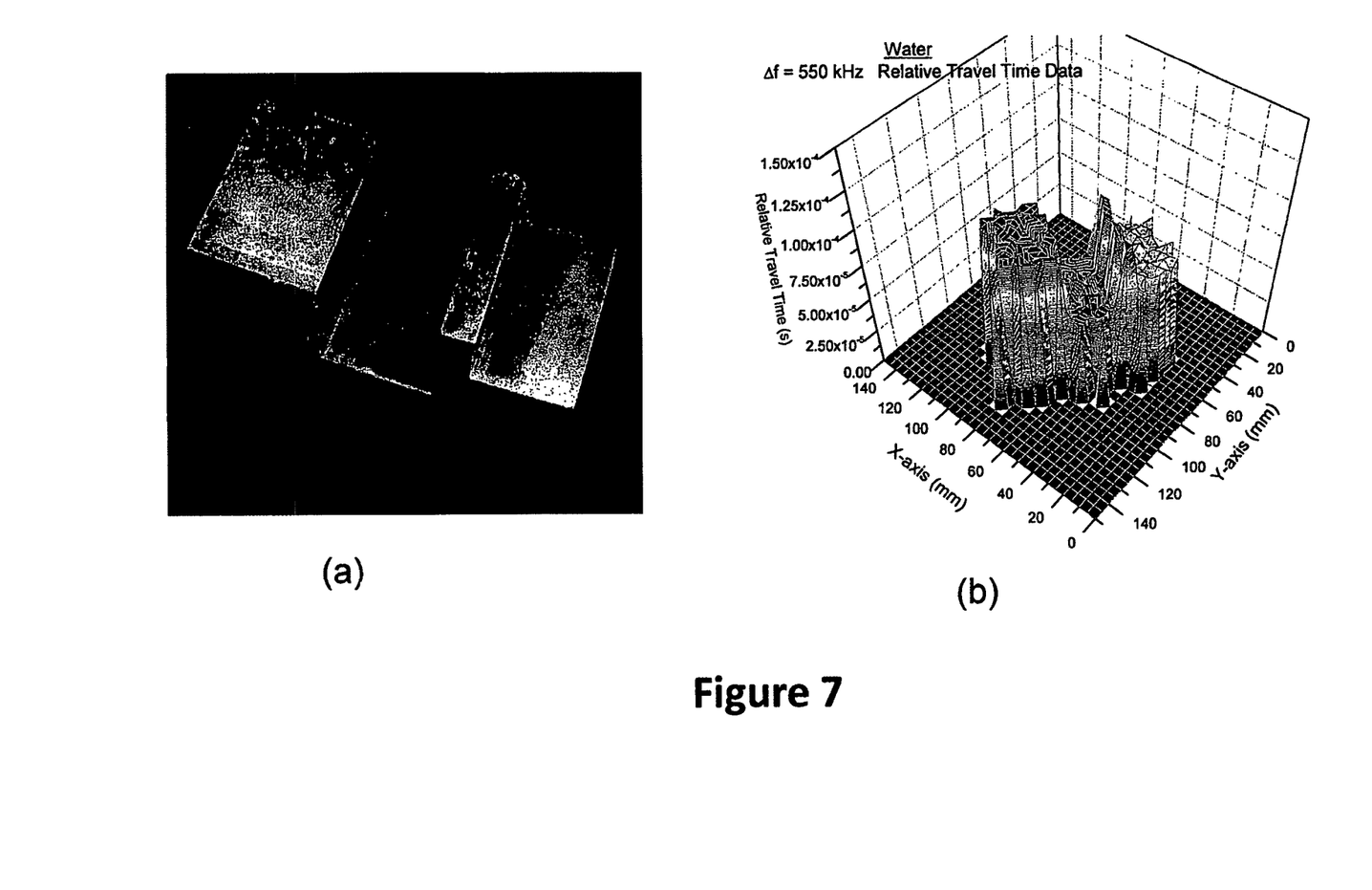
FIG. 7a shows a picture of the object imaged using the parametric source and the ring transducer.
FIG. 7b is an image of the object shown in FIG. 7a reconstructed from the time-of-flight measurement in water at 550 kHz.

FIG. 7*a* shows a picture of the sample object being imaged. The object is an aluminum block with machined sections of different depths to provide a target for imaging. The length is 7 cm, the height is 6 cm, and the width is 4 cm. The reconstructed image from the time-of-flight data is shown in FIG. 7*b*. The measurement shown is made with the object immersed under water and at a difference frequency of 550 kHz.

Figure 8:
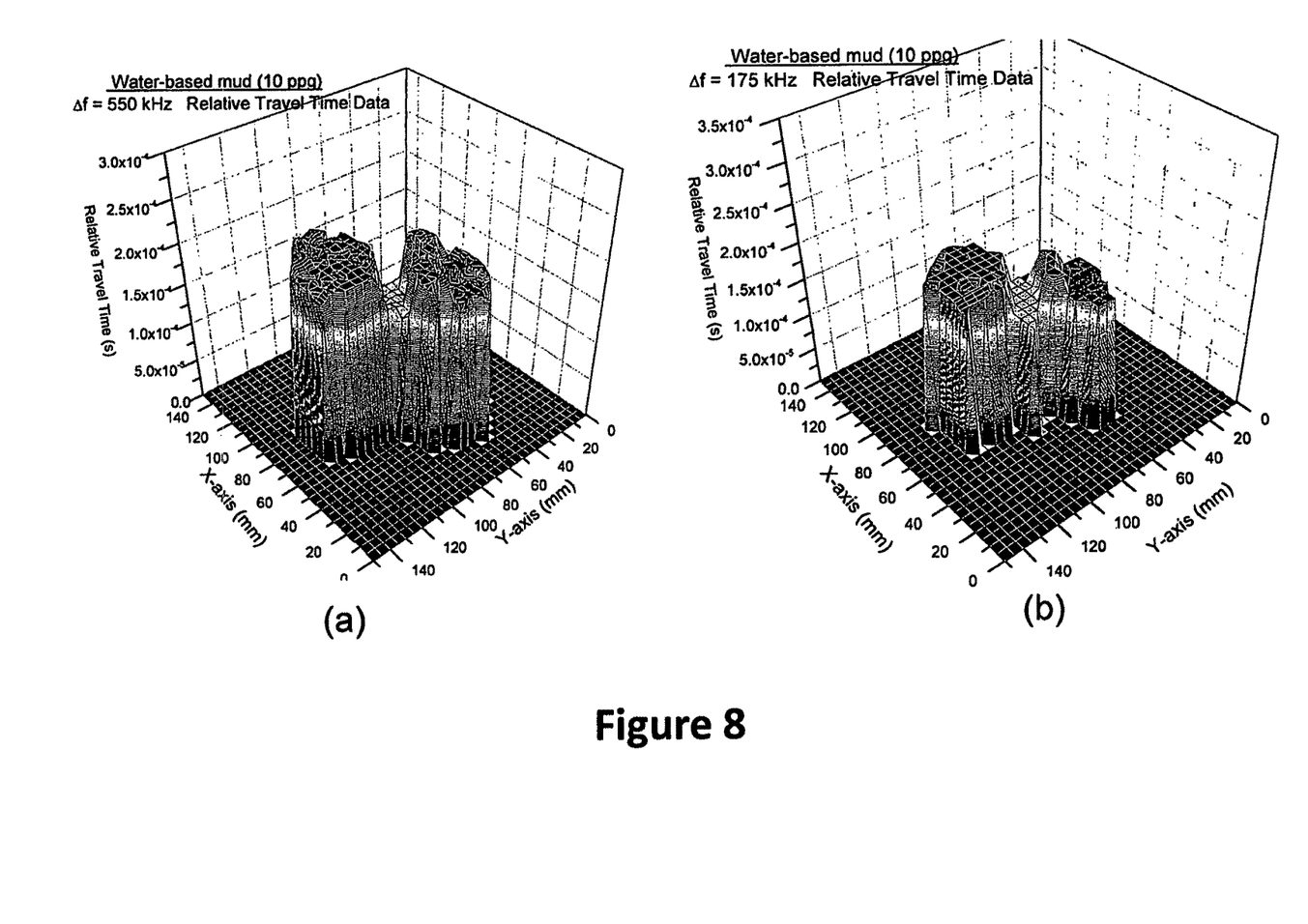
FIG. 8a is an image of the object shown in FIG. 7a reconstructed from the time-of-flight measurement in water-based 10 ppg mud at 550 kHz.
FIG. 8b shows the image of the object shown in FIG. 7a reconstructed from the time-of-flight measurement in water-based 100 ppg mud at 175 kHz.

The imaging under water-based mud of 10 ppg (pounds per gallon) consistency is presented in FIGS. 8*a* & 8*b* for difference frequencies 550 kHz and 175 kHz, respectively. The image of the object is faithfully reproduced even at such low frequencies. This is possible because of the collimated beam produced by the parametric array method of sound beam generation.

Figure 9:
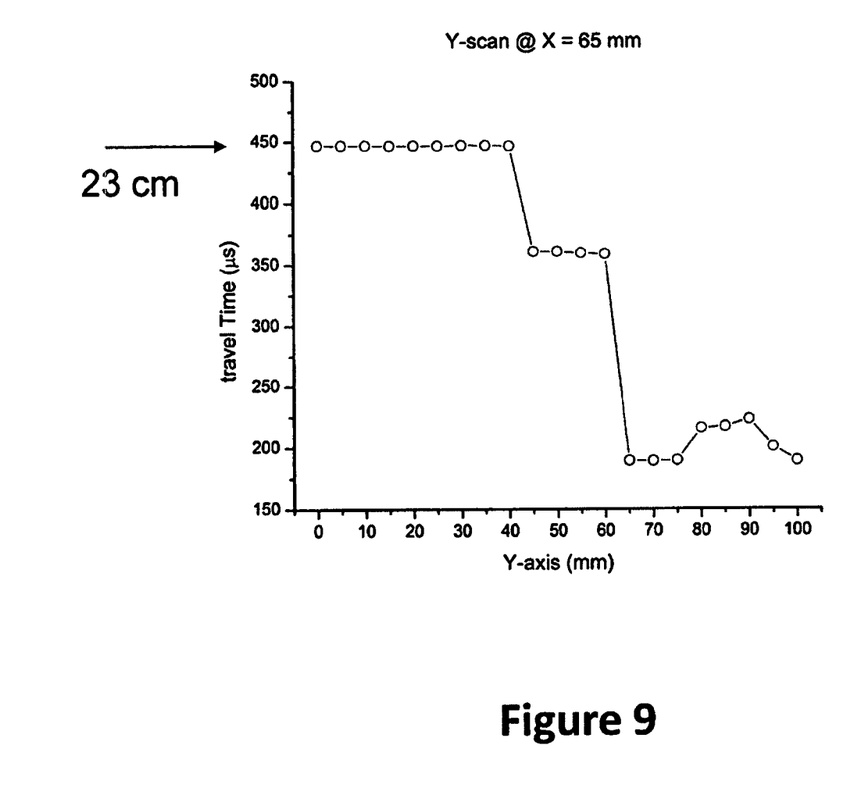
FIG. 9 shows a demonstration of depth of field of the imaging system where a single line cross-section of multiple objects at various depths is shown.

Finally, the depth of field measurement capability of this imaging system is demonstrated by stacking multiple objects on top of each other (not shown) inside an 8 inch diameter filled with drilling mud of 10 ppg consistency. In one experiment, the objects were at the bottom and the source was placed 6.7 cm from the top surface. Therefore, the total distance between the source and the bottom surface on which the object is placed is 23 cms. Only a single line scan along the object is shown for clarity in FIG. 9. The y-axis of the plot is travel time and so the longest travel time indicates the farthest point and in this case the bottom surface of the target. Measurements were made in oil-based mud as well with similar success. The highest density mud used was 15 ppg for imaging.

This invention shows that it is indeed possible to image objects immersed in highly attenuating and optically fluids, such as drilling mud and good depth of field measurement is possible. There can be many other applications of this invention as it can be used anywhere where it is important to have a low frequency collimated beam for greater penetration and imaging, such a biomedical applications, contraband detection, imaging under opaque fluids and harsh environment in general etc.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art.

What is claimed is:

1. An apparatus for imaging at least one object in a fluid, said apparatus comprising:
    a hollow container having a first end cover and an opposing second end cover effective for sealing said container, and an outer surface, said container being filled with a nonlinear acoustic liquid having a sound speed between about 470 m/s and 700 m/s;
    at least one first piezoelectric transducer element in acoustic communication with the nonlinear acoustic liquid either directly or through the first end cover of said container;
    a first source of voltage in electrical communication with said at least one transducer effective for generating pulses of sound having a first chosen frequency in the nonlinear acoustic liquid;
    a second source of voltage in electrical communication with said at least one first transducer effective for generating pulses of sound having a second chosen frequency in the nonlinear acoustic liquid;
    whereby the sound pulses having the first frequency are collinear with the sound pulses having the second chosen frequency such that collimated pulses of sound having a difference frequency between the first chosen frequency and the second chosen frequency are generated in the nonlinear acoustic liquid and pass through the second end cover of said container and into said fluid containing said object, the ratio of the first chosen frequency to the difference frequency being less than 45;
    at least one second piezoelectric transducer disposed outside of said container for receiving sound pulses having the difference frequency exiting said container and after having been reflected from said object;
    a mechanical drive for moving said container such that the pulsed difference frequency of ultrasound exiting therefrom is scanned in a two-dimensional pattern across said object;
    a digital signal processor for analyzing the time-of-flight of pulses received by said second transducer; and
    a microprocessor for controlling the mechanical drive, said first source of voltage, said second source of voltage, and said digital signal processor.

2. The apparatus of claim 1, wherein the nonlinear acoustic liquid has an acoustic nonlinearity ≥5.

3. The apparatus of claim 1, wherein the nonlinear acoustic liquid comprises a Fluorinert liquid.

4. The apparatus of claim 3, wherein the nonlinear acoustic liquid comprises Fluorinert 43.

5. The apparatus of claim 1, wherein said at least one piezoelectric transducer element comprises a piezoelectric disk.

6. The apparatus of claim 1, wherein the first sound pulses comprise a frequency chirp having a selected frequency range.

7. The apparatus of claim 6, wherein the second sound pulses comprise a tone burst having the chosen frequency.

8. The apparatus of claim 1, wherein the difference frequency is between about 50 kHz and about 3 MHz.

9. The apparatus of claim 1, wherein the two-dimensional pattern of movement of the pulsed difference frequency comprises an arc-shaped path.

10. The apparatus of claim 1, wherein the two-dimensional pattern of movement of the pulsed difference frequency comprises a linear x-y path.

11. The apparatus of claim 1, wherein said container comprises a cylindrical container.

12. The apparatus of claim 11, wherein said at least one second piezoelectric transducer comprises a ring transducer disposed on the outside surface of said cylindrical container.

13. The apparatus of claim 1, wherein said at least one first piezoelectric transducer comprises a piezoelectric disc.

14. The apparatus of claim 1, wherein said fluid containing said object is chosen from liquids containing bubbles, crude oil, water, and drilling mud, and mixtures thereof.

15. A method for imaging at least one object in a fluid, the method comprising:
    placing a liquid having acoustic nonlinearity, and having a sound speed between about 470 m/s and 700 m/s in a sealed hollow container;
    generating sound pulses in the nonlinear acoustic liquid having a first chosen frequency;
    generating sound pulses in the nonlinear acoustic liquid having a second chosen frequency;
    whereby the sound pulses having the first frequency are collinear with the sound pulses having the second chosen frequency such that collimated pulses of sound having a difference frequency between the first frequency and the second frequency are generated in the nonlinear acoustic liquid, and exit the sealed container, the ratio of the first chosen frequency to the difference frequency being less than 45;
    receiving pulses of sound reflected by the object on a detector external to the sealed container;
    moving the sealed container such that the pulsed difference frequency of sound pulses exiting therefrom is scanned in a two-dimensional pattern across the object; and
    analyzing the time-of-flight of the pulses reflected from the object.

16. The method of claim 15, wherein the first fixed-frequency of sound and the second chosen frequency of sound are generated using at least one piezoelectric transducer.

17. The method of claim 15, wherein the nonlinear acoustic liquid has an acoustic nonlinearity ≥5.

18. The method of claim 15, wherein the nonlinear acoustic liquid comprises a Fluorinert liquid.

19. The method of claim 18, wherein the nonlinear acoustic liquid comprises Fluorinert 43.

20. The method of claim 15, wherein the first sound pulses comprise a frequency chirp having a selected frequency range.

21. The method of claim 20, wherein the second sound pulses comprise a tone burst having the chosen frequency.

22. The method of claim 15, wherein the difference frequency is between about 50 kHz and about 3 MHz.

23. The method of claim 15, wherein the two-dimensional pattern of movement of the pulsed difference frequency comprises an arc-shaped path.

24. The method of claim 15, wherein the two-dimensional pattern of movement of the pulsed difference frequency comprises a linear x-y path.

25. The method of claim 15, wherein the fluid containing the object is chosen from liquids containing hubbies, crude oil, water, and drilling mud, and mixtures thereof.

* * * * *